(12) United States Patent
Tsukamoto

(10) Patent No.: US 7,293,905 B2
(45) Date of Patent: Nov. 13, 2007

(54) AREA LIGHT SOURCE DEVICE AND LIQUID CRYSTAL DISPLAY APPARATUS

(75) Inventor: Takayoshi Tsukamoto, Kodama-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 163 days.

(21) Appl. No.: 11/150,275

(22) Filed: Jun. 13, 2005

(65) Prior Publication Data

US 2005/0276070 A1 Dec. 15, 2005

(30) Foreign Application Priority Data

Jun. 15, 2004 (JP) ............................. 2004-176864

(51) Int. Cl.
*F21V 7/04* (2006.01)

(52) U.S. Cl. ...................... 362/607; 362/618; 362/620; 362/624; 362/626

(58) Field of Classification Search ........ 362/606–607, 362/615, 618, 620, 623–626; 349/61–65
See application file for complete search history.

(56) References Cited

U.S. PATENT DOCUMENTS 5,779,337 A 7/1998 Saito et al.
5,966,192 A * 10/1999 Higuchi et al. ............... 349/61

FOREIGN PATENT DOCUMENTS

| JP | 2004-12591 | 1/2004 |
|----|------------|--------|
| KR | 1997-0075992 | 12/1997 |
| KR | 2002-0084132 | 11/2002 |
| WO | WO 02/48756 A1 | 6/2002 |

* cited by examiner

*Primary Examiner*—Ali Alavi
*Assistant Examiner*—Jason Moon Han
(74) *Attorney, Agent, or Firm*—Oblon, Spivak, McClelland, Maier & Neustadt, P.C.

(57) ABSTRACT

An area light source device includes a light source, a light guide including a first side surface on which emission light from the light source is incident, and a first major surface and a second major surface, which are opposed to each other and from which the incident light on the first side surface emerges, an optical sheet that is disposed on the second major surface side of the light guide and has a reflective surface on a side thereof that is opposed to the second major surface, and a film member that is disposed between the light guide and the optical sheet, has light transmissivity and has a projection-and-recess-shaped portion on a surface thereof.

4 Claims, 4 Drawing Sheets

AREA LIGHT SOURCE DEVICE AND LIQUID CRYSTAL DISPLAY APPARATUS

CROSS-REFERENCE TO RELATED APPLICATIONS

This application is based upon and claims the benefit of priority from prior Japanese Patent Application No. 2004-176864, filed Jun. 15, 2004, the entire contents of which are incorporated herein by reference.

BACKGROUND OF THE INVENTION

1. Field of the Invention

The present invention relates to an area light source device that illuminates a liquid crystal display panel and to a liquid crystal display apparatus including the area light source device.

2. Description of the Related Art

Recently, in an increasing number of liquid crystal display apparatuses that selectively pass emission light from area light source devices and display images, a reflective sheet is disposed on the back side of a light guide in order to improve the efficiency of use of emission light from the area light source device and to meet a demand for higher luminance. The reflective sheet is, for instance, a film whose basic material is polyethylene terephthalate (PET). As a result, bending or waviness tends to occur on the reflective sheet.

On the other hand, a light guide in an area light source device is formed of an acrylic resin, a polycarbonate resin, etc. in various shapes in accordance with product specifications in consideration of the function and the intended application of the light guide. Since the light guide is formed of the resin material, there is a certain degree of warp or waviness due to heat, or warp or waviness due to forming.

In the case where the above-described reflective sheet is directly disposed on the back surface of the light guide, the following problem may arise. That is, due to bending or waviness of the reflective sheet and due to the effect of warp or waviness of the light guide, there may be a part (contact part) where the reflective sheet contacts the back surface of the light guide and a part (non-contact part) where the reflective sheet is not in contact with the back surface of the light guide. Between the contact part and non-contact part, the angle of reflection varies when light leaking from the back surface of the light guide is reflected toward the light guide. If each of the contact part and non-contact part has a relatively large area, non-uniformity in luminance may be caused on the light emission surface of the light guide. In the liquid crystal display apparatus including such an area light source device, non-uniformity in luminance may be visually recognized and the display quality may deteriorate.

In order to solve this problem, there has been proposed a method in which a projection-and-recess-shaped portion is provided on the back surface of the light guide, or projections are provided on the surface of the reflective member that is disposed on the back side of the light guide. Thereby, the area of the contact part is reduced, and non-uniformity in luminance is made difficult to perceive (see, e.g. Jpn. Pat. Appln. KOKAI Publication No. 2004-12591).

However, if a reflective sheet having a mirror-finished reflective surface on its side that is opposed to the back surface of the light guide is adopted in order to further improve the efficiency of use of emission light from the light source, the relative position between the light guide and the reflective sheet may be displaced. Consequently, the reflective surface may contact and damage the projection-and-recess-shaped portion on the back surface of the light guide. In addition, if foreign matter enters between the light guide and the reflective sheet, both the reflective surface and light guide tend to be easily damaged by the foreign matter due to a displacement in relative position between the light guide and reflective sheet. As a result, light leaking from the light guide to the reflective sheet side cannot efficiently be used, and enhancement in luminance may be hindered.

BRIEF SUMMARY OF THE INVENTION

The present invention has been made in consideration of the above-described problem, and the object of the invention is to provide an area light source device that can improve non-uniformity in luminance and enhance luminance, and a liquid crystal display apparatus including the area light source device.

According to a first aspect of the present invention, there is provided an area light source device comprising: a light source; a light guide including an incidence surface on which emission light from the light source is incident, and a first major surface and a second major surface, which are opposed to each other and from which the incident light on the incidence surface emerges; an optical sheet that is disposed on the second major surface side of the light guide and has a reflective surface on a side thereof that is opposed to the second major surface; and a film member that is disposed between the light guide and the optical sheet, has light transmissivity and has a projection-and-recess-shaped portion on a surface thereof.

According to a second aspect of the present invention, there is provided a liquid crystal display apparatus comprising: a liquid crystal display panel including an effective display section on which a plurality of display pixels are arranged; and an area light source device that illuminates the liquid crystal display panel, the area light source device including: a light source; a light guide including an incidence surface on which emission light from the light source is incident, a first major surface that emits the incident light from the incidence surface toward the liquid crystal display panel, and a second major surface that is opposed to the first major surface; an optical sheet that is disposed on the second major surface side of the light guide and has a reflective surface on a side thereof that is opposed to the second major surface; and a film member that is disposed between the light guide and the optical sheet, has light transmissivity and has a projection-and-recess-shaped portion on a surface thereof.

The present invention can provide an area light source device that can improve non-uniformity in luminance and enhance luminance, and a liquid crystal display apparatus including the area light source device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An area light source device according to an embodiment of the present invention and a liquid crystal display apparatus including the area light source device will now be described with reference to the accompanying drawings.

Figure 1:
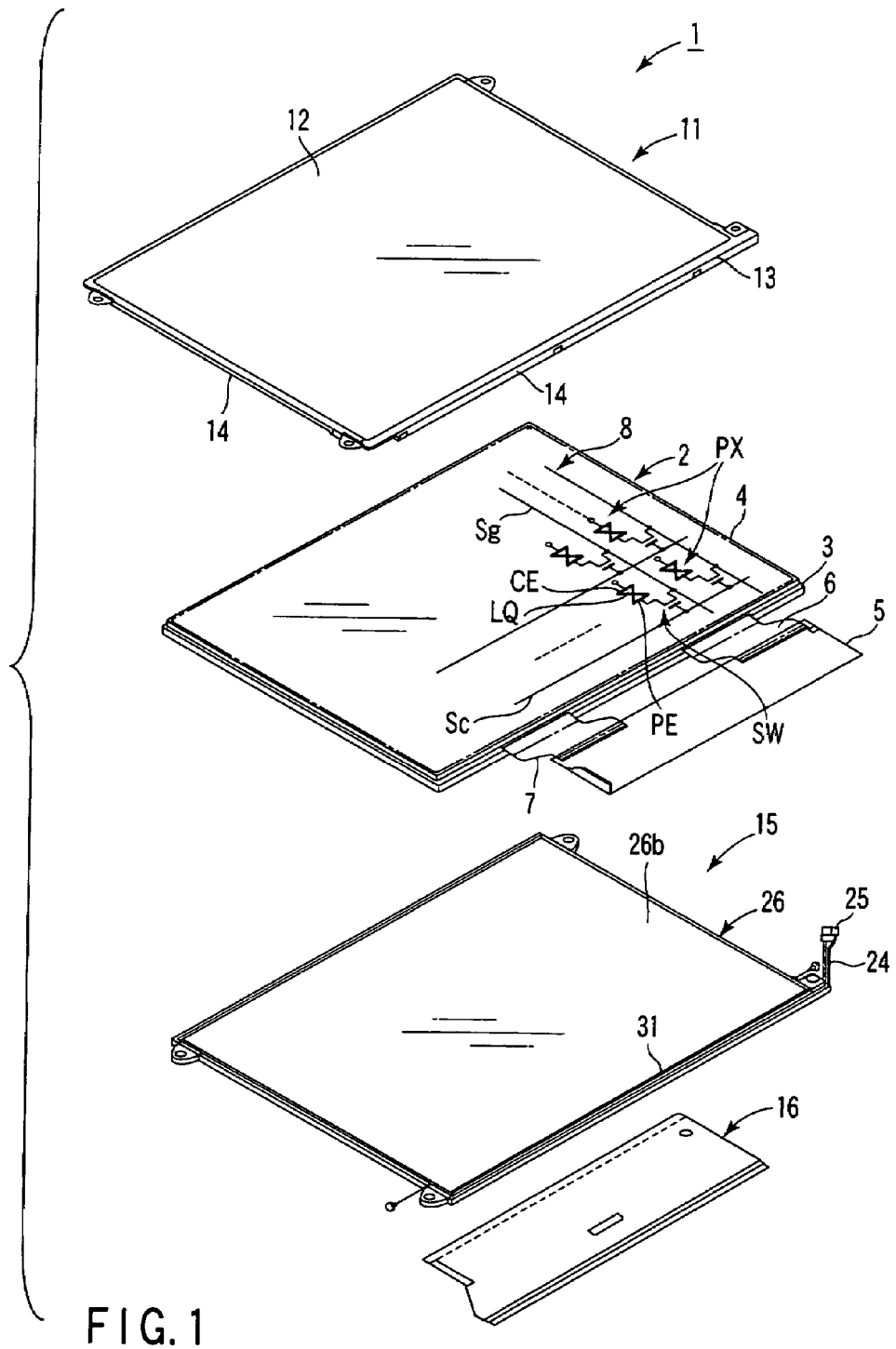
FIG. 1 is an exploded perspective view that schematically shows the structure of a liquid crystal display apparatus that includes an area light source device according to an embodiment of the present invention.

As is shown in FIG. 1, a liquid crystal display apparatus 1 includes a substantially rectangular, planar transmissive liquid crystal display panel 2. The liquid crystal display panel 2 is configured such that a liquid crystal layer LQ that serves as an optical modulation layer is interposed between a pair of substrates, that is, an array substrate 3 and an counter substrate 4. The liquid crystal display panel 2 includes a substantially rectangular effective display section 8 that displays an image. The effective display section 8 is composed of a plurality of display pixels PX that are arranged in a matrix.

The array substrate 3 includes switching elements SW, such as thin-film transistors, which are arranged near intersections between scan lines Sc and signal lines Sg in association with the respective display pixels PX, and pixel electrodes PE that are connected to the switching elements SW. The counter substrate 4 includes a counter-electrode CE. The pixel electrodes PE and counter-electrode CE are formed of an electrically conductive material with light transmissivity. The array substrate 3 and counter substrate 4 are disposed such that the pixel electrodes PE are opposed to the counter-electrode CE, and a gap is created therebetween. The liquid crystal layer LQ is formed of a liquid crystal composition that is sealed in the gap between the array substrate 3 and counter substrate 4.

The liquid crystal display panel 2 is disposed between a bezel cover 11 and a backlight 15 that functions as an area light source device. Specifically, the bezel cover 11, which has a rectangular frame-like shape, is attached to a front surface (i.e. on the counter substrate side) of the liquid crystal display panel 2. The bezel cover 11 includes a rectangular window part 12, which exposes the effective display section 8 of the liquid crystal display panel 2, and a frame-shaped main body part 13 that defines the window part 12. The main body part 13 includes an outer peripheral portion 14 that covers an outer edge part of the liquid crystal display panel 2 when the liquid crystal display panel 2 is accommodated.

A driver circuit 5, which serves as a circuit board for supplying a drive signal to the liquid crystal display panel 2, is electrically connected to one side edge of the liquid crystal display panel 2 via a plurality of flexible printed circuit boards 6, 7. The driver circuit 5 is disposed on the back side of the backlight 15 by bending the printed circuit boards 6 and 7 toward the back side of the backlight 15. An insulation sheet 16 is disposed on the back side of the driver circuit 5. The insulation sheet 16 secures insulation between the driver circuit 5 and an enclosure for mounting the liquid crystal display apparatus.

The rectangular, planar backlight 15, together with the liquid crystal display panel 2, is accommodated in the bezel cover 11 such that the front surface of the backlight 15 is opposed to the back surface (i.e. on the array substrate side) of the liquid crystal display panel 2. The backlight 15 illuminates the back surface of the liquid crystal display panel 2.

Figure 2:
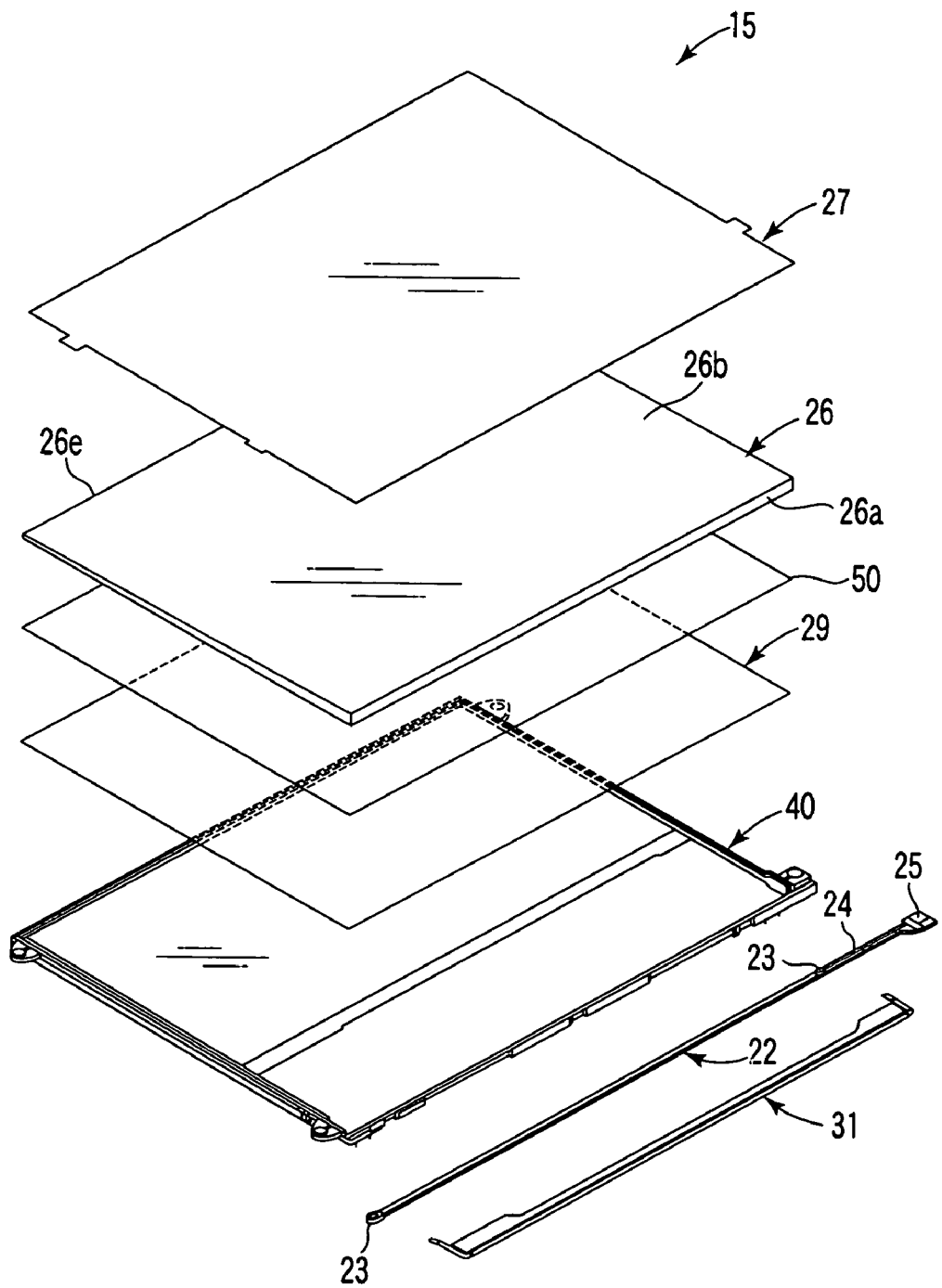
FIG. 2 is an exploded perspective view that schematically shows the structure of the area light source device shown in FIG. 1.
Figure 3:
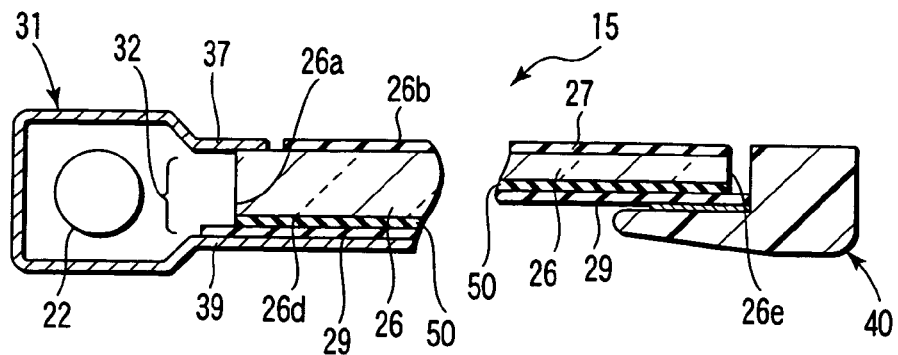
FIG. 3 is a cross-sectional view that schematically shows the structure of the area light source device shown in FIG. 1.

The backlight 15, as shown in FIG. 2 and FIG. 3, includes a cold-cathode fluorescent lamp 22 that is an elongated cylindrical light source. Both end portions of the cold-cathode fluorescent lamp 22 are engaged with lamp holders 23. The lamp holders 23 are formed of an elastic material such as rubber. Two cables 24 are connected at one end to both ends of the cold-cathode fluorescent lamp 22. The cables 24 are attached at the other end to a housing 25 that serves as a connector.

The backlight 15 includes a substantially rectangular, planar light guide 26 that converts linear emission light from the cold-cathode fluorescent lamp 22 to planar light and emits the planar light. The light guide 26 has a first major surface 26b and a second major surface 26d, which are opposed to each other, and a first side surface 26a and a second side surface 26e, which connect the first major surface 26b and second major surface 26d. The light guide 26 is disposed in the state in which the first side surface 26a is opposed to, and in parallel to, the longitudinal direction of the cold-cathode fluorescent lamp 22 and in the state in which the first major surface 26b is opposed to the back surface of the liquid crystal display panel 2. In short, the first side surface 26a is a light incidence surface on which emission light from the cold-cathode fluorescent lamp 22 is incident. The first major surface 26b and second major surface 26d are light emission surfaces that can emit the incident light from the light incidence surface. The first major surface 26b is a light emission surface that emits the incident light toward the liquid crystal display panel 2.

Figure 4:
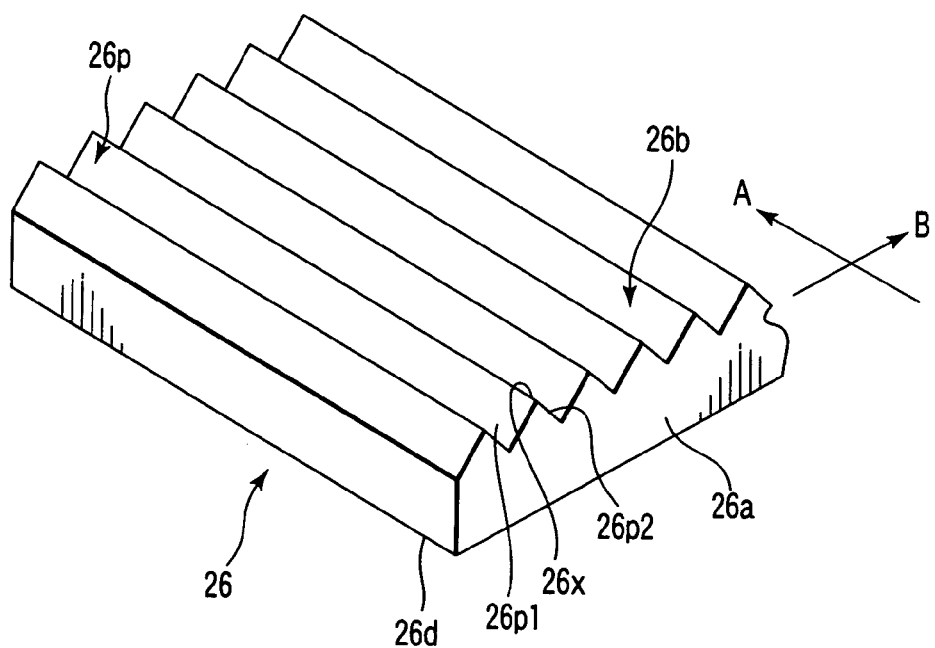
FIG. 4 is a perspective view that schematically shows the structure of a light guide that is applied to the area light source device shown in FIG. 1.

The light guide 26 is a prism waveguide that is configured such that prisms each with a light collecting function are formed on at least one of the first major surface 26b and second major surface 26d. The prism waveguide can efficiently guide the emission light from the cold-cathode fluorescent lamp 22 to the liquid crystal display panel 2, and contributes to enhancement of luminance. In this embodiment, as shown in FIG. 4, the light guide 26 has prism-shaped portions 26p on its first major surface 26b. Each prism-shaped portion 26p extends in a normal direction A of the first side surface 26a and has an apex corner 26x along the normal direction A. The apex corner 26x corresponds to an intersection between two planar surfaces 26p1 and 26p2 of the prism-shaped portion 26p. The prism-shaped portions 26p are arranged in a direction B that is perpendicular to the normal direction A.

The light guide 26 converts linear emission light to planar light. To be more specific, the light guide 26 deflects linear emission light from the cold-cathode fluorescent lamp 22, which is incident on the first side surface 26a, toward the first major surface 26b (or totally reflects the linear emission light by the second major surface 26d) and converts the linear emission light to planar emission light. In short, the light guide 26 emits planar light from the first major surface 26b toward the back surface of the liquid crystal display panel 2.

The light guide 26 is formed of a light-transmissive resin such as an acrylic resin or a polycarbonate resin. In this embodiment, the light guide 26 is formed in such a wedge shape that the thickness of the light guide 26 gradually decreases from the first side surface 26a toward the second side surface (non-light incidence surface) 26e. The thickness of the light guide 26, in this context, corresponds to the height in the normal direction of the first major surface 26b. With this shape, the incident light on the first side surface 26a of the light guide 26 is equally reflected toward the first major surface 26b, and a space for accommodating the driver circuit 5, etc. is provided on the second major surface 26d side, which is located on the second side surface 26e side of the light guide 26. In particular, the wedge-shaped light guide should preferably be applied to an edge-light type backlight that illuminates a large-sized liquid crystal display panel.

The substantially rectangular optical sheet 27 is disposed so as to cover the first major surface 26b of the light guide 26. The optical sheet 27 imparts predetermined optical characteristics to the planar emission light from the first major surface 26b of light guide 26. The optical sheet 27 is, for instance, an optical control sheet that changes a direction of emission light from the first major surface 26b, a light collecting sheet that collects emission light from the first major surface 26b, or a diffusion sheet that diffuses emission light from the first major surface 26b.

The optical sheet 29 is disposed on the second major surface 26d side of the light guide 26. The optical sheet 29 is a reflective sheet that reflects light, which leaks out from the inside of the light guide 26 through the second major surface 26d, toward the first major surface 26b of the light guide 26. The optical sheet 29 has a substantially rectangular shape with a size greater than the size of the second major surface 26d of the light guide 26. The optical sheet 29 extends to the first side surface 26a side of the light guide 26.

The backlight 15 further includes a lamp reflector 31 that serves as a reflector for reflecting emission light from the cold-cathode fluorescent lamp 22 toward the first side surface 26a of the light guide 26. The lamp reflector 31, as shown in FIG. 3, has a substantially C-shaped cross section. The lamp reflector 31 is so disposed as to surround the cold-cathode fluorescent lamp 22 that is opposed to the first side surface 26a of the light guide 26.

The lamp reflector 31 forms an opening portion 32 for extracting emission light from the cold-cathode fluorescent lamp 22. The opening portion 32 is opposed to the first side surface 26a of the light guide 26. The opening portion 32 is defined between a distal end portion 37 and a distal end portion 39 of the lamp reflector 31. The distal end portions 37 and 39 are opposed to each other and clamp the light guide 26 in its thickness direction.

The cold-cathode fluorescent lamp 22, light guide 26, optical sheet 27, optical sheet 29 and lamp reflector 31 are accommodated in the substantially rectangular frame 40.

Figure 5:
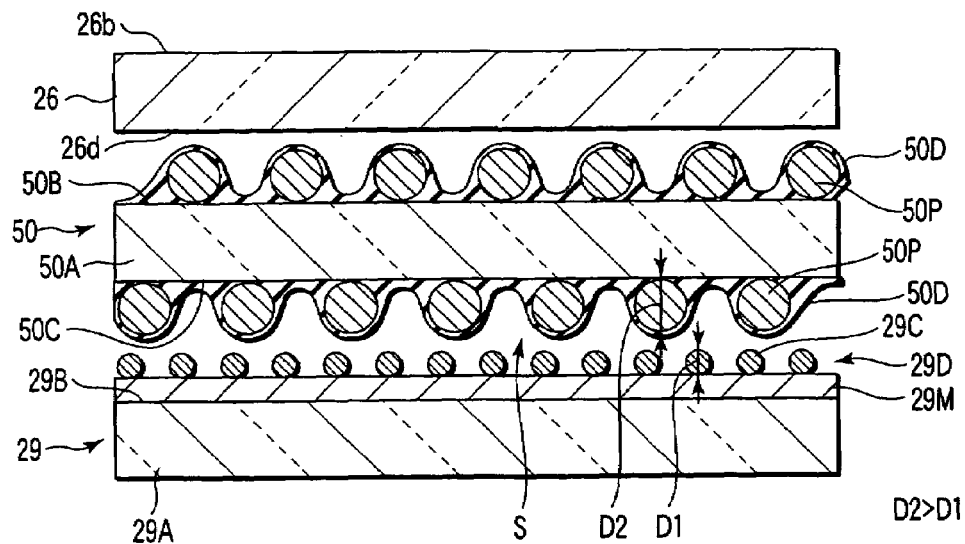
FIG. 5 schematically shows an example of the structure of a film member that is interposed between the waveguide and an optical sheet, which is applicable to the area light source device shown in FIG. 1.

As is shown in FIG. 5, the optical sheet 29 has a mirror-finished reflective surface 29M on a side thereof that is opposed to the second major surface 26d of the light guide 26. Specifically, the reflective surface 29M is formed, for example, by depositing a light-reflective metallic material such as silver (Ag) on one major surface 29B of a base material 29A that is formed of, e.g. polyethylene terephthalate (PET).

In the case where the optical sheet 29 with the reflective surface 29M is combined with the light guide 26, non-uniformity in luminance tends to easily occur due to formation of a relatively large area of a part (contact part) where the reflective surface 29M is in contact with the second major surface 26d of light guide 26, and a relatively large area of a part (non-contact part) where the reflective surface 29M is not in contact with the second major surface 26d of light guide 26. In addition, when the relative position between the light guide 26 and optical sheet 29 varies, the reflective surface 29M may directly contact the light guide 26 or friction of intervening foreign matter may occur between the reflective surface 29M and light guide 26. Consequently, both the light guide 26 and optical sheet 29 tend to be damaged, and the desired performance of the backlight may not be obtained.

In this embodiment, as shown in FIG. 2, FIG. 3 and FIG. 5, a light-transmissive film member 50 having projection-and-recess-shaped portions on its surfaces is disposed between the light guide 26 and optical sheet 29. Specifically, the film member 50 has projection-and-recess-shaped portions 50D on major surfaces 50B and 50C of a base material 50A that is formed of a light-transmissive resin material such as polyethylene terephthalate (PET). The projection-and-recess-shaped portions 50D can be formed by coating, on the major surfaces 50B and 50C of the base material 50A, a material in which spherical elements 50P formed of a light-transmissive resin material, such as an acrylic resin or silicone resin, are dispersed in a binder resin.

The provision of the film member 50 prevents direct contact between the light guide 26 and the reflective surface 29M of the optical sheet 29. In addition, since the film member 50 has the projection-and-recess-shaped portions 50D, the contact area between the film member 50, on the one hand, and the light guide 26 and optical sheet 29, on the other hand, is very small and is dispersed in accordance with the distribution of the projection-and-recess-shaped portions 50D. In other words, a non-contact part is created substantially entirely between the light guide 26 and film member 50. Similarly, a non-contact part is created substantially entirely between the optical sheet 29 and film member 50. Since the film member 50 has light transmissivity, light leaking from the second major surface 26d of light guide 26 is passed through the film member 50 with little loss. Moreover, reflective light from the reflective surface 29M of optical sheet 29 is passed through the film member 50 with little loss and is guided to the light guide 26.

Most of light leaking from the second major surface 26d of light guide 26 passes through the non-contact part and is reflected by the optical sheet 29 toward the light guide 26. Thus, a difference in angle of reflection is reduced on the optical sheet 29. Thereby, non-uniformity in luminance becomes difficult to visually perceive in the illumination light from the backlight.

Since the film member 50 is interposed between the light guide 26 and optical sheet 29, the film member 50 functions as a buffer when the relative position between the light guide 26 and optical sheet 29 varies. Thus, no friction occurs between the light guide 26 and optical sheet 29. Moreover, the amount of relative displacement between the light guide 26 and film member 50 and the amount of relative displacement between the optical sheet 29 and film member 50 become sufficiently small, in relation to the amount of displacement in relative position between the light guide 26 and optical sheet 29. Therefore, damage to the light guide 26 and optical sheet 29 can be suppressed.

In this embodiment, the optical sheet 29 has a projection-and-recess-shaped portion 29D, in which spherical elements 29C are dispersed, on its reflective surface 29M side. It is preferable that the projection-and-recess-shaped portion 29D be different in size from the projection-and-recess-shaped portion 50D formed on the major surface 50C of the film member 50 that contacts the optical sheet 29. In the example shown in FIG. 5, the projection-and-recess-shaped portion 50D of the film member 50 is greater in size than the projection-and-recess-shaped portion 29D of the optical sheet 29. In this example, the size of the projection-and-recess-shaped portion 29D of the optical sheet 29 substantially corresponds to a grain size D1 of the spherical element 29C. Similarly, the size of the projection-and-recess-shaped portion 50D of the film member 50 substantially corresponds to a grain size D2 of the spherical element 50P. In short, in the example shown in FIG. 5, D1<D2.

By virtue of the above-described structure, the mutually opposed projection-and-recess-shaped portions 29D and 50D are not meshed with each other, and a space S is defined therebetween. Even if foreign matter enters between the optical sheet 29 and film member 50, the foreign matter can be taken in the space S and is prevented from damaging the light guide 26 and optical sheet 29.

The hardness of the surface of the optical sheet 29, which contacts the film member 50, is about 2B to 3B in terms of pencil hardness. On the other hand, the hardness of the surface of the film member 50, which contacts the optical sheet 29, is equal to, or less than, the hardness of the surface of the optical sheet 29. Hence, even if the optical sheet 29 and film member 50 come in contact, the reflective surface 29M is not easily damaged and a sufficient reflection performance can be maintained.

Since the light leaking from the second major surface 26D of light guide 26 can effectively be used, the efficiency of use of emission light from the light source is improved and the enhancement in luminance can be realized.

Figure 6:
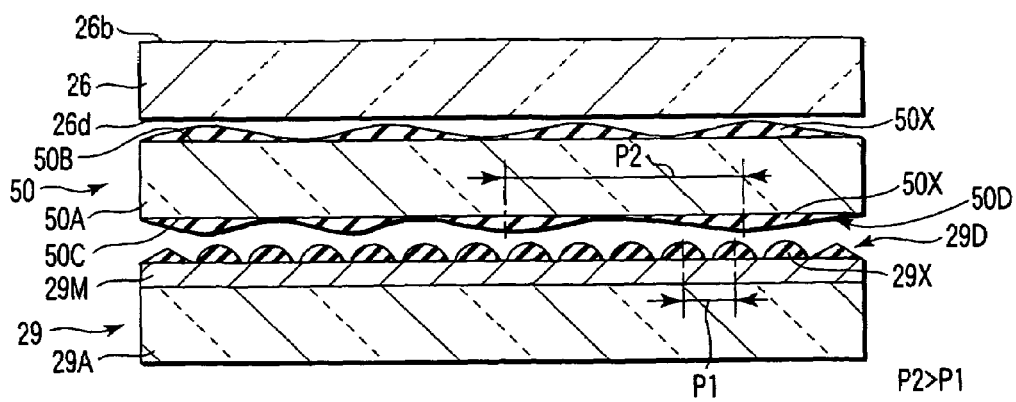
FIG. 6 schematically shows another example of the structure of the film member that is interposed between the waveguide and optical sheet, which is applicable to the area light source device shown in FIG. 1.

As in an example shown in FIG. 6, the optical sheet 29 may have a projection-and-recess-shaped portion 29D, which is formed of a resin material, on its reflective surface 29M side. In addition, the major surfaces 50B and 50C of the film member 50 may have projection-and-recess-shaped portions 50D that are formed of a resin material. In this example, the size of the projection-and-recess-shaped portion 29D of the optical sheet 29 substantially corresponds to a pitch P1 between the apices of adjacent projection patterns 29X. Similarly, the size of the projection-and-recess-shaped portion 50D of the film member 50 substantially corresponds to a pitch P2 between the apices of adjacent projection patterns 50X. In this example, too, the projection-and-recess-shaped portion 50D, which is formed on the major surface 50C of the film member 50 that contacts the optical sheet 29, is different in size from the projection-and-recess-shaped portion 29D of the optical sheet 29. For instance, the relationship, P1<P2, is satisfied. Thus, the same advantageous effect as in the example described with reference to FIG. 5 can be obtained.

The film member 50 may be an optical sheet with light diffusion properties. That is, the film member 50 may pass light, which leaks from the second major surface 26d of light guide 26, with no substantial loss, and may have light diffusion properties. The application of the film member 50 can improve such a non-uniformity in luminance that a local increase occurs in luminance near the cold-cathode fluorescent lamp 22, without greatly reducing the efficiency of use of emission light from the cold-cathode fluorescent lamp 22.

Next, the operation of the liquid crystal display apparatus including the above-described area light source device is described.

To begin with, electric energy is supplied to the cold-cathode fluorescent lamp 22 via the housing 25 and cables 24, thereby driving the cold-cathode fluorescent lamp 22. Linear emission light from the cold-cathode fluorescent lamp 22 is directly guided to the first side surface 26a of the light guide 26, while part of the emission light is reflected by the lamp reflector 31, which covers the cold-cathode fluorescent lamp 22, and is guided to the first side surface 26a of light guide 26.

The incident light on the first side surface 26a of the light guide 26 propagates through the inside of the light guide 26 and is refracted or reflected toward the first major surface 26b of the light guide 26. Part of the incident light leaks from the second major surface 26d of light guide 26, passes through the film member 50, and is reflected by the optical sheet 29 toward the light guide 26. Thereby, planar emission light emerges from the first major surface 26b of the light guide 26.

The planar emission light from the first major surface 26b of the light guide 26 is given predetermined optical characteristics while it is passing through the prism-shaped portion 26p or optical sheet 27. For example, the emission light is properly collected or properly diffused. Thereby, the luminance of the emission light from the first major surface 26b of the light guide 26 is improved and made uniform.

The illumination light from the backlight 15, that is, planar light from the optical sheet 27, is led out to the array substrate 3 side of the liquid crystal display panel 2. The illumination light on the liquid crystal display panel 2 selectively passes through the effective display section 8 of the liquid crystal display panel 2. Thereby, an image is displayed on the effective display section 8 of the liquid crystal display panel 2.

As has been described above, according to the area light source device of this embodiment, even if the light guide or the optical sheet is deformed due to problems relating to the precision in manufacture of components or the surrounding environment of the device, it is possible to suppress occurrence of non-uniformity in luminance without lowering the luminance. Furthermore, according to the liquid crystal display apparatus including this area light source device, a high-luminance, high-quality image can stably be displayed.

The present invention is not limited to the above-described embodiments. At the stage of practicing the invention, various modifications and alterations may be made without departing from the spirit of the invention. Structural elements disclosed in the embodiments may properly be combined, and various inventions can be made. For example, some structural elements may be omitted from the embodiments. Moreover, structural elements in different embodiments may properly be combined.

For example, in the above-described embodiment, the light guide 26 is configured to have the prism-shaped portion 26p on the first major surface 26b. Alternatively, the light guide 26 may be configured to have the prism-shaped portion 26p on the second major surface 26d. In the case of this configuration, if the film member is not interposed between the second major surface 26d and reflective surface 29M, the apices 26x of the prisms may be cut by the projection-and-recess-shaped portion on the reflective surface 29M due to a variation in relative position between the light guide 26 and optical sheet 29. In addition, non-uniformity in luminance may occur due to local contact between the light guide 26 and optical sheet 29. These problems can be solved by interposing the above-described film member 50 between the light guide 26 and optical sheet 29, and the enhancement in luminance is realized. Besides, even in a case of adopting a prism waveguide having the prism-shaped portions on both the first major surface 26*b* and second major surface 26*d*, the same advantage as in the above embodiment can be obtained by disposing the film member 50.

In the above-described embodiment, the wedge-shaped light guide 26 is employed. Alternatively, a planar light guide 26 with a substantially uniform thickness may be used.

In the above-described embodiment, the single film member 50 is disposed between the light guide 26 and optical sheet 29. Alternatively, a plurality of film members may be stacked and disposed. With this structure, it becomes possible to sufficiently reduce the amount of relative displacement between the light guide 26 and the adjacent film member 50, the amount of relative displacement between the adjacent film members 50 and the amount of relative displacement between the optical sheet 29 and the adjacent film member 50, in relation to the amount of displacement in relative position between the light guide 26 and the optical sheet 29. Therefore, damage to the light guide 26 and optical sheet 29 can further be suppressed.

What is claimed is:

1. An area light source device comprising:
   a light source;
   a light guide including an incidence surface on which emission light from the light source is incident, and a first major surface and a second major surface, which are opposed to each other and from which the incident light on the incidence surface emerges;
   an optical sheet that is disposed on the second major surface side of the light guide and has a reflective surface on a side thereof that is opposed to the second major surface; and
   a film member, that is disposed between the light guide and the optical sheet, has light transmissivity and has a projection-and-recess-shaped portion on a surface thereof,
   wherein the optical sheet has, on the reflective surface thereof, a projection-and-recess-shaped portion that differs in size from the projection-and-recess-shaped portion of the film member, and the projection-and-recess-shaped portion of the film member is larger in size than the projection-and-recess-shaped portion of the optical sheet.

2. An area light source device comprising:
   a light source;
   a light guide including an incidence surface on which emission light from the light source is incident, and a first major surface and a second major surface, which are opposed to each other and from which the incident light on the incidence surface emerges;
   an optical sheet that is disposed on the second major surface side of the light guide and has a reflective surface on a side thereof that is opposed to the second major surface; and
   a film member, that is disposed between the light guide and the optical sheet, has light transmissivity and has a projection-and-recess-shaped portion on a surface thereof,
   wherein the optical sheet has, on the reflective surface thereof, a projection-and-recess-shaped portion that differs in size from the projection-and-recess-shaped portion of the film member, and the projection-and-recess-shaped portion of the film member is formed of spherical elements of an acrylic material or a silicone material, and the spherical elements are each larger in size than the projection-and-recess-shaped portion of the optical sheet.

3. A liquid crystal display apparatus comprising:
   a liquid crystal display panel including an effective display section on which a plurality of display pixels are arranged; and
   an area light source device that illuminates the liquid crystal display panel,
   the area light source device including:
   a light source;
   a light guide including an incidence surface on which emission light from the light source is incident, a first major surface that emits the incident light from the incidence surface toward the liquid crystal display panel, and a second major surface that is opposed to the first major surface;
   an optical sheet that is disposed on the second major surface side of the light guide and has a reflective surface on a side thereof that is opposed to the second major surface; and
   a film member, that is disposed between the light guide and the optical sheet, has light transmissivity and has a projection-and-recess-shaped portion on a surface thereof,
   wherein the optical sheet has, on the reflective surface thereof, a projection-and-recess-shaped portion that differs in size from the projection-and-recess-shaped portion of the film member, and the projection-and-recess-shaped portion of the film member is larger in size than the projection-and-recess-shaped portion of the optical sheet.

4. A liquid crystal display apparatus comprising:
   a liquid crystal display panel including an effective display section on which a plurality of display pixels are arranged; and
   an area light source device that illuminates the liquid crystal display panel,
   the area light source device including:
   a light source;
   a light guide including an incidence surface on which emission light from the light source is incident, a first major surface that emits the incident light from the incidence surface toward the liquid crystal display panel, and a second major surface that is opposed to the first major surface;
   an optical sheet that is disposed on the second major surface side of the light guide and has a reflective surface on a side thereof that is opposed to the second major surface; and
   a film member, that is disposed between the light guide and the optical sheet, has light transmissivity and has a projection-and-recess-shaped portion on a surface thereof,
   wherein the optical sheet has, on the reflective surface thereof, a projection-and-recess-shaped portion that differs in size from the projection-and-recess-shaped portion of the film member, and the projection-and-recess-shaped portion of the film member is formed of spherical elements of an acrylic material or a silicone material, and the spherical elements are each larger in size than the projection-and-recess-shaped portion of the optical sheet.

* * * * *